2,910,386

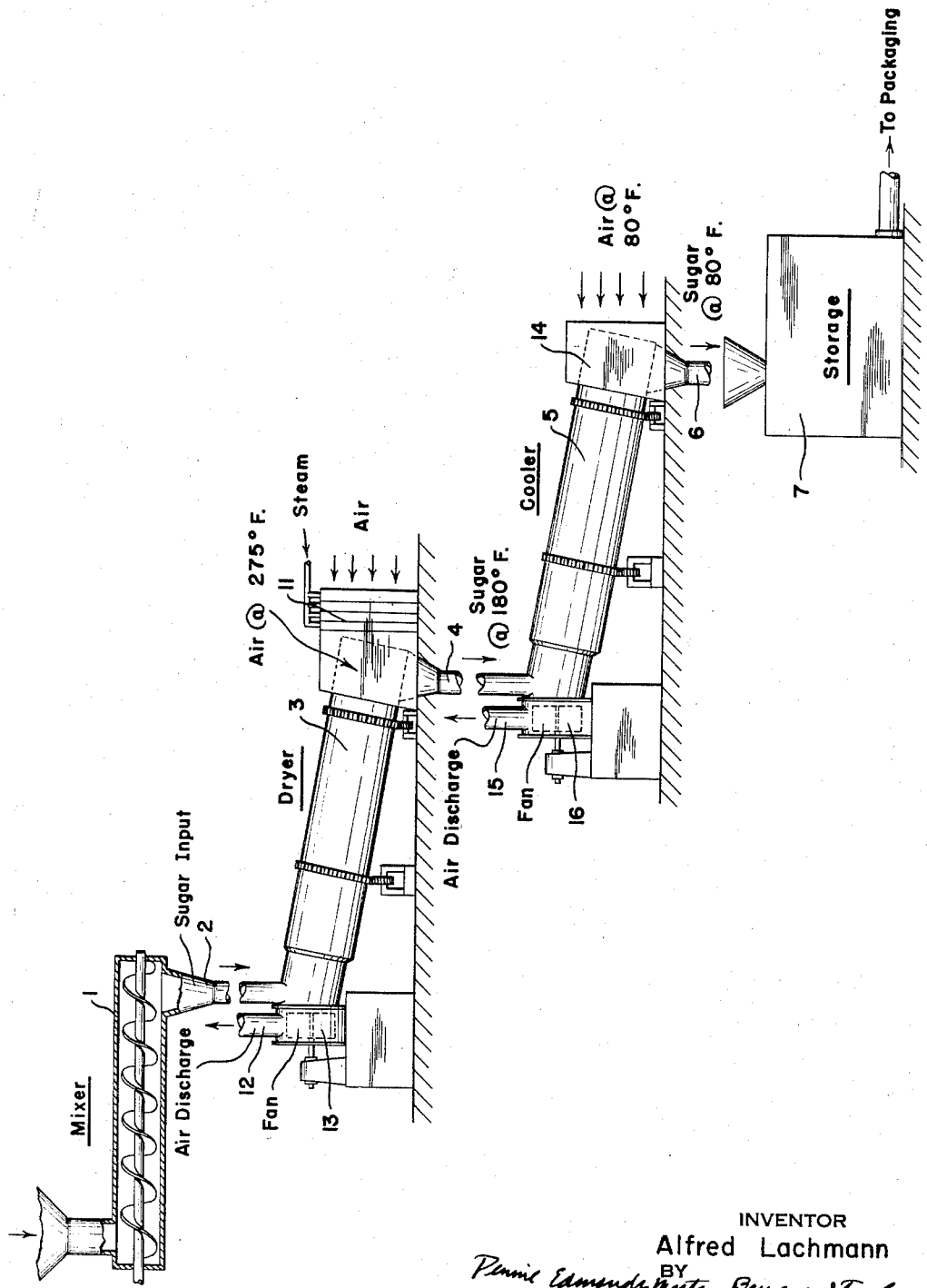

BROWN SUGAR

Alfred Lachmann, Haddonfield, N.J., assignor to The American Sugar Refining Company, New York, N.Y., a corporation of New Jersey Application March 13, 1956, Serial No. 571,259

18 Claims. (Cl. 127—30)

This invention relates to an improved free-flowing non-caking brown sugar product in granular form, and an improved powdered brown sugar product made therefrom, and includes the new products and the methods of producing them.

The improved granular brown sugar product of the present invention is made by coating ordinary granular brown sugar, or partially dried granular brown sugar, with a small amount of a relatively non-hygroscopic, edible, pulverulent coating material to coat the sticky molasses coating of the brown sugar, and drying the coated product to convert the sticky molasses coating into a dry coating and to form a product having valuable non-caking properties. By pulverizing the dried granular product an improved powdered brown sugar product is obtained.

Commercial brown sugars are commonly marketed in a moist form. The handling of such sugars presents a number of problems to the industrial user as well as to the consumer. They are usually packaged in cartons or bags which are provided with moistureproof linings. As long as the bag or carton is closed, the brown sugar keeps its smooth texture. When a carton of brown sugar is opened and exposed to the air at room temperature, the sugar has a tendency to lose some of its moisture under certain climatic conditions, and during this drying out period, the brown sugar tends to cake and to harden. The hard lumps formed are difficult to disintegrate and present a number of handling and mixing problems to the industrial user and to the consumer.

Brown sugar contains, in addition to pure sucrose as its principal constituent, a coating of molasses which imparts the distinctive flavor and color to this type of sugar. The molasses, which is composed of sucrose, invert sugar, ash, water and other crystallizable and non-crystallizable compounds, surrounds the pure sucrose crystals in the form of a thin and sticky film. When brown sugar loses part of its moisture, by drying under certain atmospheric conditions, the thin film of molasses surrounding the sugar crystals increases in stickiness and cements the adjacent crystals together, thus forming a hard lump.

I have found that if granular brown sugar, or partially dride granular brown sugar, with a sticky molasses coating, is coated with a small amount of a relatively non-hygroscopic, edible, pulverulent, solid material, and is then dried to convert the moist molasses layer into a dry, solid layer, a valuable non-caking, granular brown sugar product can be produced which is free-flowing, which will not become sticky under ordinary fluctuating atmospheric conditions for relatively long periods of time, and which retains the characteristic flavor and taste of brown sugar, or a somewhat modified taste due to the coating material.

The amount of pulverulent coating material used will vary somewhat with different materials, but in general will be within the range of 1% to 10% of the weight of the brown sugar, somewhat smaller amounts being required where the brown sugar is partially dried before coating than where the brown sugar is coated with its normal moisture content in the molasses layer.

The pulverulent coating materials used include solids which are insoluble in the molasses layer, but adhere thereto and form a coating thereon, as well as pulverulent materials which may be soluble to some extent in the molasses but which are used in excess of the amount which will dissolve in the molasses, so as to form a coating of such pulverulent material.

The relatively non-hygroscopic, edible, pulverulent, solid materials used for coating the brown sugar before drying include both organic and inorganic materials. Illustrative of organic pulverulent coating materials are starches such as cornstarch, wheat starch, tapioca, etc., dextrins, cereal flours, relatively non-hygroscopic pulverulent sugars, such as confectioner's sugar, dextrose, lactose and fructose, dextran, organic esters such as sucrose stearate, etc., proteins and proteinaceous foods in pulverulent form, such as casein, egg albumin and milk powder, etc. The edible pulverulent materials may be in part organic and in part inorganic, such as calcium lactate, magnesium stearate and other salts of organic acids, or entirely inorganic in character, such as tricalcium phosphate, calcium silicate, etc.

A combination of two or more coating materials may advantageously be used and may be more effective than a single coating material alone. Thus, agents such as calcium silicate, sodium silicoaluminate and other conditioners may be combined with cornstarch, e.g. in the proportions of 1% or less of calcium silicate and 2% of cornstarch added to the brown sugar before drying to form the coating material.

When, for example, a small amount of starch, between about 1% and 5%, is used to coat the wet, granular brown sugar, or the partially dried, but still wet, granular brown sugar, and the coated brown sugar is then dried, the moist molasses layer is converted into a dry layer and a relatively non-hygroscopic starch layer is formed around the molasses film and is baked on the brown sugar during the drying process to give a final product highly resistant to fluctuating atmospheric conditions.

When powdered white sugar, such as confectioner's sugar, is used to coat the brown sugar or the partially dried brown sugar with an amount in excess of that which will dissolve in the molasses layer, and sufficient to form an outer layer of the powdered sugar, and when this layer is similarly baked during the drying process, a final product is obtained which is highly resistant to fluctuating atmospheric conditions and to caking.

While brown sugar with its normal moisture content can advantageously be used in the improved process, and in producing the improved products, of the invention, the partial drying of the granular brown sugar to reduce the water content of the molasses layer, e.g. to 1.5% to 2%, is advantageous in that less starch or powdered sugar or other edible relatively non-hygroscopic, pulverulent material is required for an effective coating of the product, and a product of improved stability can thereby be obtained.

Instead of using a single coating material, for coating the granular brown sugar, two successive coatings can advantageously be applied to form a dried product having a double outer layer or a composite outer layer surrounding the dried molasses layer. Thus, instead of using starch alone, or instead of using fine sugar such as confectioner's sugar or powdered sugar alone for coating the granular brown sugar, two successive coatings can be used, the first being a coating of the powdered sugar, following by coating with a small amount of starch. The resulting dried product will have a double or composite outer layer surrounding the dried molasses layer.

The drying of the granular brown sugar after coating, or the partial drying of the granular brown sugar before coating, can be carried out in different types of apparatus, but is advantageously carried out by drying with hot air and with agitation of the granular sugar during drying. Drying equipment such as the Hersey granulator can thus be used, and it is one advantage of the present process that the drying of the granular brown sugar after coating, or with the partial drying of the granular brown sugar before coating, can be carried out in available drying equipment.

The drying of the granular brown sugar after coating is advantageously carried out by the use of hot air at elevated temperatures and with agitation of the granular brown sugar to maintain it in a granular condition during the drying operation. When the product is so dried, it is important to cool the resulting hot, dried product to room temperature, advantageously with continued agitation in the apparatus. The temperature of the dry, granular product leaving the drying apparatus should not exceed around 85°–90° F.

The proper drying time will depend upon the construction and type of drying equipment, the air temperature at which the product is dried, the rate of air passing through the drying equipment, and the feed of the raw material. The moisture level to which the product should be dried to make it free-flowing will vary somewhat with the different grades of brown sugar, but it should be a relatively low moisture content and, in general, the lower the moisture level the greater the resistance of the product to fluctuating atmospheric conditions.

In general, the drying should be carried to a point such that the dried coated brown sugar has less than 1% of moisture, and advantageously a small fraction of 1%, although improved products have been obtained in some cases with somewhat larger percentages of moisture in the final product.

In order to evaluate the caking resistance or resistance to moisture of the dried brown granular sugar product under controlled conditions, the following method was adopted for testing the caking resistance or resistance to moisture of the product:

The method was an accelerated method consisting in exposing 10 grams of the product to be tested in an open aluminum dish to a temperature of 85° F. and a relative humidity of 70%. The sample is slightly tilted during the experiment, in order to test its resistance toward flow.

When the product starts to lose its free-flowing characteristics, which is observed by tilting the dish back and forth, the time of resistance to caking is recorded.

These conditions represent adverse atmospheric conditions and, if the product is free-flowing under these extremely unfavorable conditions for a long period of time, it is assumed that it will resist caking under normal fluctuating atmospheric conditions.

The invention will be further described in connection with the following examples, but it will be understood that the invention is not limited thereto.

*Example 1.*—The brown sugar used had the following analysis: sugar (polarization) 88.5%, invert 3.6%, moisture 3.1%, ash 2.8%, and undetermined 2.0%. Three percent of pulverized cornstarch was added to the brown sugar and thoroughly mixed therewith to form a layer of starch thereon.

The apparatus used was a laboratory rotary drum type drier, through which hot air at a temperature of around 136° to 145° C. was passed, and the product was dried with rotation of the drier and agitation of the product for periods of 20, 40, 60 and 80 minutes, with removal of samples at the end of each of these periods and immediate cooling of the samples to room temperature. The samples were screened through a No. 10 Tyler mesh screen to remove over-size granules. The moisture content and resistance to caking in minutes of the screened samples by the above test are shown in the following table:

| Drying time | Moisture, percent | Resistance to caking, minutes |
|---|---|---|
| 20 minutes | 1.10 | 40 |
| 40 minutes | 0.64 | 55 |
| 60 minutes | 0.50 | 90 |
| 80 minutes | 0.38 | 110 |

*Example 2.*—The brown sugar used was similar to that of Example 1 and had a moisture content of 3.58% and a polarization value of 89.2%. This sugar was admixed with 10% of 4X confectioner's sugar and coated therewith and was then subjected to drying in a manner similar to that described in Example 1 until the moisture content of the dried and screened product was about 0.4%. This product showed a resistance to moisture of 50 minutes.

*Example 3.*— The granular brown sugar referred to in Example 2 was first dried to a moisture content of 1.55%. This dried product was then admixed with 10% of 4X confectioner's sugar and treated in a manner similar to that described in Example 2 until the moisture content of the dried and screened product was about 0.4%. This product showed a resistance to moisture of 150 minutes.

*Example 4.*—The granular brown sugar used was the same as that referred to in Example 2, with 3.58% moisture content. 10% of powdered brown sugar, such as described in my prior application Serial No. 550,534, filed December 2, 1955, of a fineness corresponding to about 4X–6X confectioner's sugar was used instead of the confectioner's sugar as described in Example 2, and the product was dried until the dried and screened product had a moisture content of 0.3%. This product showed a resistance to moisture of 120 minutes.

*Example 5.*—The brown sugar of the preceding example was partially dried to a moisture content of 1.55% and the process was otherwise such as described in the preceding examples, using 10% of powdered brown sugar. The resulting product of about 0.3% moisture content had a resistance to moisture of 150 minutes.

*Example 6.*—The same brown sugar was used as referred to in Example 2 with a moisture content of 3.58%, and 3% starch was added, and the process carried out as described in Example 2 to give a dried and screened product of a moisture content of about 0.5%. This product showed a resistance to moisture of 150 minutes.

*Example 7.*—The brown sugar of the preceding example was partially dried to a moisture content of 1.55% and was then admixed with 3% starch, and the process carried out as described in the preceding example to give a dried, screened product with a moisture content of about 0.5%. This product showed a resistance to moisture of 150 minutes.

*Example 8.*—The brown sugar used had the following analysis: sugar (polarization)—88.7%; invert—3.27%; moisture—2.77%; ash—2.13%; and undetermined—2.43%.

This brown sugar was partially dried to a moisture content of 1.5%. This partially dried brown sugar was admixed in a Hobart mixer with 5% of starch, passing through a 325 mesh screen before use, and the admixture continued until a homogeneous mixture was obtained. The so-coated product was then transferred to a laboratory granulator, dried for 30 minutes with air at 130° C. passing over it, and cooled for 20 minutes with cold air and with continued agitation until the sugar reached a room temperature of about 25° C. The dried product was then screened through a 10 mesh screen. It showed a resistance to moisture of 140 minutes.

*Example 9.*—5% of dextrin was used instead of 5% starch in the manner described in Example 8, and gave a product with a moisture resistance of 50 minutes. When 10% of dextrin was used in a similar way, the product had a moisture resistance of 80 minutes.

*Example 10.*—Using 5% of all-purpose flour instead of 5% starch, according to the procedure of Example 8, a product was obtained having a moisture resistance of 125 minutes.

*Example 11.*—Using 5% of lactose instead of 5% of starch, according to the procedure of Example 8, the resulting product had a resistance to moisture of 65 minutes.

*Example 12.*—Using 5% of dextrose instead of 5% starch in the process of Example 8 gave a product having a resistance to moisture of 40 minutes. The use of 10% of dextrose instead of 5% gave a product with a resistance to moisture of 60 minutes.

*Example 13.*—Using 5% of casein powder instead of 5% of starch according to the procedure of Example 8 gave a product with a resistance to moisture of 40 minutes.

*Example 14.*—Using 5% of dextran instead of 5% of starch in the procedure of Example 8 gave a product having a resistance to moisture of 45 minutes. Using 10% of dextran in a similar way gave a product having a resistance to moisture of 130 minutes.

*Example 15.*—5% of tricalcium phosphate was used instead of 5% starch, according to the procedure of Example 8, and gave a product with a moisture resistance of 150 minutes.

*Example 16.*—The use of 5% calcium silicate instead of 5% tricalcium phosphate in a similar manner to that of the preceding example gave a product having a resistance to moisture of 110 minutes.

*Example 17.*—The use of 5% of calcium lactate instead of 5% of starch according to the procedure of Example 8 gave a product having a resistance to moisture of 130 minutes.

The carrying out of the process on a plant scale can advantageously be accomplished in such an apparatus as that illustrated conventionally in the accompanying drawing. In the apparatus illustrated, a mixer is indicated conventionally at 1 for mixing the granular brown sugar with starch, or other edible, relatively non-hygroscopic, pulverulent material, before drying. From the mixer 1, the sugar flows through the conduit 2 to the upper inlet end of a rotary dryer such as the Hersey granulator 3. From the lower outlet end of the dryer, the sugar passes through the conduit 4 to the upper inlet end of a second rotary drum such as a Hersey granulator 5, which serves as a cooler and for further drying the granular sugar. From the lower discharge end of the cooler 5, the dried and cooled granular sugar passes through the spout 6 and over a 10 mesh Tyler screen (not shown) to remove oversize granules, and the screened product is then passed to a storage bin or receptacle 7, from which the dry material can be passed to packaging equipment.

At the lower outlet end of the dryer 3, provision is made for introducing hot air, the air being preheated, e.g. to around 275° F., by passing over steam heated coils 11. From the upper end of the dryer, air is discharged through the outlet pipe 12, and circulation of air is effected by the blower 13.

The lower Hersey granulator or cooler has provision for the introduction of cool air, e.g. at around 80° F., at 14, and the air is discharged from the cooler through the outlet 15, with circulation effected by the fan 16.

In such an apparatus, the brown sugar in its normal granular form is introduced and admixed with the starch or other pulverulent material and dried by the hot air while it is agitated and kept in granular form, and the hot dried coated sugar is discharged from the lower end of the dryer to the upper end of the cooling drum, where it is kept in agitation and subjected to the action of cool air to cool the dried sugar, and to accomplish further drying if the sugar has not been sufficiently dried in the dryer section so that the product discharged from the cooler is a dried and cooled granular product ready to be sent to storage or to packaging equipment. The dried granular product can be screened to remove oversize or undersize granules and give a product or products of limited screen size of granules, before packaging.

Where the granular sugar is to be partially dried, e.g. to 1.5% to 2% of moisture, before coating with the starch or other pulverulent material, the pulverulent material can be added at an intermediate stage of the process, such as a point in the dryer 3 where the sugar has been dried to the desired extent, care being taken that the pulverulent material added is not carried away to too large an extent by the hot air current passing through the dryer until it has a chance to admix with and coat the partially dried brown sugar. After the hot, partially dried, granular brown sugar is thus coated, the further drying will give the desired product.

The carrying out of the process in the apparatus thus described is illustrated by the following examples:

*Example 18.*—The brown sugar used had a sucrose content (polarization) of 87.85%, invert of 3.55%, moisture 4.35%, ash 1.19% and undetermined 3.06%. To this sugar was added 2% of starch, which was mixed with the sugar in the mixer 1. The feed rate of the brown sugar with the admixed starch was about 4,000 lbs. per hour. The air temperature entering the dryer was about 275° F. and the dried sugar left the dryer 3 at a temperature of 170–180° F. In the cooler or granulator 5, cool air at a temperature of about 85° F. was supplied and the product cooled to a discharge temperature of 82° F. and with a moisture content of 0.21%. The resulting dried and screened product had a high resistance to caking.

*Example 19.*—The brown sugar used had a polarization value of 90.2% and a moisture content of 4.77%. To this sugar was added 3% of starch and the process was carried out as described in Example 18. The dried and screened product had a moisture content of 0.4% and a resistance to caking of more than 100 minutes.

*Example 20.*—The brown sugar used was a lighter grade (No. 8) with a lower molasses content than the brown sugar of the above examples. This brown sugar had the following analysis: sugar (polarization), 91.90%; invert, 2.58%; moisture, 3.65%; ash, 0.78%; and undetermined, 1.09%. The sugar was treated in an apparatus such as that above described and illustrated, except that the admixing of the sugar with 3% of cornstarch was effected at the time the mixture was added to the drying cylinder, and some of the added cornstarch was carried away by the hot air passing through the dryer, so that only about 1.25% was present in the dried product. The average temperature of the brown sugar, after passing through the drying cylinder was between 180° and 200° F., and the average temperature of the sugar removed after passing through the cooling cylinder was around 82° F. The average moisture content of the sugar removed, after passing through the dryer, was about 0.20%. The product thus produced showed a moisture resistance of more than 150 minutes.

The drying of the granular brown sugar with hot air at elevated temperatures, as described in the above examples, leaves a dry coating which, while hot, is still soft or plastic, and it is important to cool such a hot, dried product to a low temperature before it is discharged from the dryer and exposed to the surrounding atmosphere.

In my prior application Ser. No. 550,534, I have described the production of an improved brown sugar product in powdered form by pulverizing dried granular brown sugar to form a finely pulverulent product.

When the product of the above example was pulverized as described in said prior application, it gave a pulverized product which had a resistance to moisture of more than 150 minutes.

In a similar manner, the dried products of the other examples can be pulverized to form composite pulverized products containing the broken up sugar crystals blended with the broken up particles of the dried molasses and coating materials.

The granular product produced as above described, for example, in the apparatus illustrated in the drawing, can, after cooling, be discharged directly to a pulverizer, as described in said prior application, to convert the dried granular product into a pulverized brown sugar product.

The drying of the coated granular brown sugar product should be carried to the extent that the sticky molasses film is converted into a solid coating. The drying of the coated granular brown sugar should, in general, be carried to the point where the moisture content is less than about 1% and advantageously, in many cases, to a small fraction of 1%. However, the coating materials used may themselves be capable of absorbing a limited amount of moisture, so that the product, after exposure to the air, may have an overall moisture content of somewhat more than 1%. But such an amount of moisture can be held by the coating in many cases without interfering with the free-flowing nature of the product.

While the dried, granular brown sugar product with its coating of pulverulent material has greatly increased resistance to caking, it is in most cases readily soluble in water, although in some cases it may dissolve somewhat more slowly than the uncoated brown sugar. The dried, coated brown sugar product has the desirable and characteristic taste and flavor of brown sugar, but may have a somewhat modified taste in some cases due to the nature of the coating material used, which may be desirable in giving a modified brown sugar flavor or taste.

The pulverized product produced from the dried granular brown sugar product with its coating of pulverulent material is also an improved powdered brown sugar product with the desirable and characteristic taste and flavor of brown sugar, but which may also have a somewhat modified taste in some cases, due to the nature of the coating material used, and which may be desirable in giving a modified brown sugar flavor and taste.

This application is a continuation-in-part of my prior applications, Serial Nos. 550,534 and 550,535, filed December 2, 1955.

I claim:

1. The method of converting granular brown sugar having a molasses layer on the sugar crystals into a free-flowing, dry, granular sugar product resistant to caking, which comprises adding to and coating the molasses layer on the brown sugar with from about 1% to 10% of a relatively non-hygroscopic, edible, pulverulent solid, and drying the coated brown sugar to reduce the moisture content to less than 1% and to convert the molasses layer into a solid layer coated with the added coating material.

2. The process according to claim 1, in which the granular brown sugar is partially dried to remove a portion of the moisture content therefrom before the coating material is added thereto.

3. The process according to claim 1, in which the resulting dried product is pulverized.

4. The process according to claim 1, in which the coated granular brown sugar is dried with agitation at an elevated temperature at which the dried molasses layer is plastic and with subsequent cooling with agitation to a temperature below about 90° F.

5. The process according to claim 4, in which the resulting dried product is pulverized.

6. The process according to claim 1 in which the coated brown sugar is passed continuously through a dryer with agitation and subjected to the action of hot air therein to dry the same and in which the resulting dry brown sugar is cooled by passing continuously with agitation through a cooler with passage of cool air therethrough to cool the dried product to a temperature below about 85° to 90° F.

7. The process according to claim 6 in which the coating material is added to the partially dried brown sugar while still hot from the drying operation and before cooling.

8. The process according to claim 6, in which the resulting dried product is pulverized.

9. The process according to claim 1 in which the pulverulent solid is a member of the group consisting of starch and sugar.

10. The process of claim 9 in which the resulting dried product is pulverized.

11. A dry, granular brown sugar product having the molasses coating thereon in a dry, solid form, and having a coating thereon and adhering thereto of about 1% to 10% of a relatively non-hygroscopic, edible, pulverulent solid, and said product being a free-flowing, granular, brown sugar product highly resistant to caking, and containing less than 1% of moisture.

12. A dry, granular brown sugar product having the molasses coating thereon in a dry, solid form, and having a coating thereon and adhering thereto of about 1% to 10% of a relatively non-hygroscopic, edible, pulverulent solid of organic nature, and said product being a free-flowing, granular, brown sugar product highly resistant to caking, and containing less than 1% of moisture.

13. A dry, granular brown sugar product having the molasses coating thereon in a dry, solid form, and having a coating thereon and adhering thereto of about 1% to 10% of a relatively non-hygroscopic, edible, pulverulent solid of inorganic nature, and said product being a free-flowing, granular, brown sugar product highly resistant to caking, and containing less than 1% of moisture.

14. A dry, granular brown sugar product having the molasses coating thereon in a dry, solid form, and having a coating thereon and adhering thereto of about 1% to 10% of a relatively non-hygroscopic, edible, pulverulent solid partly organic and partly inorganic in nature, and said product being a free-flowing, granular, brown sugar product highly resistant to caking, and containing less than 1% of moisture.

15. A dry granular brown sugar product according to claim 12 in which the pulverulent solid is a member of the group consisting of starch and sugar.

16. A pulverized, dry, brown sugar product resulting from the pulverizing of the granular product of claim 13.

17. A pulverized, dry, brown sugar product resulting from the pulverizing of the granular product of claim 14.

18. A pulverized dry brown sugar product resulting from the pulverizing of the granular product of claim 15.

References Cited in the file of this patent

UNITED STATES PATENTS

| Number | Name | Date |
|---|---|---|
| 1,871,895 | Luscher | Aug. 16, 1932 |
| 2,222,830 | Moss | Nov. 26, 1940 |
| 2,329,694 | Bodman | Sept. 21, 1943 |
| 2,400,292 | Dalton | May 14, 1946 |
| 2,818,356 | Shookhoff | Dec. 31, 1957 |

OTHER REFERENCES

Beet Sugar Technology, R. A. McGinnis, 1951, New York, N.Y., pp. 388, 389, 414.

Ser. No. 356,560, Hara (A.P.C.), published May 11, 1943.